US 006666504B2

(12) United States Patent
Guanzon et al.

(10) Patent No.: US 6,666,504 B2
(45) Date of Patent: Dec. 23, 2003

(54) SLIDING COVER FOR TIE DOWN ANCHOR

(75) Inventors: Ruben Guanzon, Powell, OH (US);
Hideyuki Tanahashi, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/035,944

(22) Filed: Dec. 26, 2001

(65) Prior Publication Data

US 2003/0116987 A1 Jun. 26, 2003

(51) Int. Cl.⁷ .............................................. B60R 27/00
(52) U.S. Cl. ..................... 296/222; 296/216.04; 296/40
(58) Field of Search ........................... 296/37.1, 40, 43, 296/65.03, 222, 216.04, 221; 248/499, 500, 503, 503.1; 410/112, 113, 114, 108; 280/801.1, 801.2

(56) References Cited

U.S. PATENT DOCUMENTS

| | | | | | |
|---|---|---|---|---|---|
| 2,193,608 | A | * | 3/1940 | Votypka | |
| 2,208,712 | A | * | 7/1940 | Votypka | |
| 3,414,226 | A | * | 12/1968 | Patnaude | |
| 3,556,457 | A | * | 1/1971 | Patnaude | |
| 3,737,194 | A | * | 6/1973 | Lutz et al. | |
| 4,715,754 | A | * | 12/1987 | Scully | 410/111 |
| 4,948,311 | A | * | 8/1990 | St. Pierre et al. | 410/110 |
| 4,993,343 | A | * | 2/1991 | Czipri | 248/499 |
| 5,419,603 | A | * | 5/1995 | Kremer et al. | 410/112 |
| 5,443,239 | A | * | 8/1995 | Laporte | 248/503.1 |
| 5,954,380 | A | * | 9/1999 | Ament et al. | 296/24.1 |
| 6,065,917 | A | * | 5/2000 | Shambeau et al. | 410/112 |
| 6,138,975 | A | * | 10/2000 | McDaid | 248/499 |
| 6,416,265 | B1 | * | 7/2002 | Flores et al. | 410/110 |
| 6,485,055 | B1 | * | 11/2002 | Swayne et al. | 280/801.1 |
| 6,499,786 | B2 | * | 12/2002 | Takahashi | 296/65.03 |
| 6,523,800 | B2 | * | 2/2003 | Hsu | 248/499 |

FOREIGN PATENT DOCUMENTS

JP         6-55960      *  3/1994  .............. 248/503.1

* cited by examiner

*Primary Examiner*—Stephen T. Gordon
*Assistant Examiner*—Hilary Gutman
(74) *Attorney, Agent, or Firm*—Rankin, Hill, Porter & Clark LLP

(57) ABSTRACT

A cover assembly is secured to a panel and operable to selectively cover or reveal an opening in the panel. The cover assembly includes a sliding cover and a housing. The housing is secured to the panel and includes lateral and vertical guide members. The lateral guide members engage the cover and maintain the cover in alignment with the opening as the cover is moved between an open position and a closed position. The vertical guide members engage a lower surface of the cover and serve to bias the cover upwardly as the cover is moved into the closed position so that the cover upper surface is substantially flush with the panel upper surface when the cover is closed.

17 Claims, 3 Drawing Sheets

SLIDING COVER FOR TIE DOWN ANCHOR

BACKGROUND OF THE INVENTION

In automobile assemblies it is increasingly common to provide tie downs at multiple locations that are accessible to the user. Often times, such tie downs are not always used, and as such, tie downs or anchors have been developed that are pivotal from a use position to a storage position. The use position typically is one in which the tie down or anchor extends or projects above a surface of the vehicle while the storage position is typically one in which the tie down or anchor is flush with or slightly below the associated vehicle surface.

While these arrangements work satisfactorily in some applications, there are circumstances in which this arrangement is not feasible. In such circumstances, it is necessary or desirable to provide the tie down or anchor in a fixed configuration. However, in such a fixed orientation the anchor presents an obstruction to movement of cargo and people, and therefore creates additional problems.

Therefore, there exists a need in the art for a fixed anchor that is disposed in a position that does not present an obstruction to movement. Moreover, there exists a need in the art for such an anchor that is readily and selectively concealed and revealed by a cap. Finally, there exists a need in the art for a cap that is movable between a closed position that is substantially flush with a surrounding vehicle surface and an open position that reveals the anchor for normal use.

SUMMARY OF THE INVENTION

The present invention is generally directed toward a fixed anchor that is disposed in a position that does not present an obstruction to movement. The present invention is further directed toward a fixed anchor that is disposed in a well and is recessed relative to a surrounding vehicle surface wherein the well includes a sliding cap to gain access to the anchor. Finally, the present invention is directed toward a cap that is movable between a closed position that is substantially flush with a surrounding vehicle surface and an open position that reveals the anchor for normal use.

The present invention relates to a cover assembly adapted for securement to a panel. The cover assembly includes a sliding cover and a housing member. The panel defines an opening about which the cover assembly is secured. The housing member is secured to a lower surface of the panel, and defines a cup-shaped portion into which extends a tie down or anchor. The sliding cover is movable between a closed position, wherein the cover is substantially flush with the upper surface of the panel, and an open position, in which the anchor is accessible via the opening in the panel.

In further accordance with the present invention, the cover has a central portion and a pair of lateral portions that are recessed relative to the central portion. The lateral portions are received between the lower surface of the panel and the housing member as the cover is slidably moved between the open and closed positions. The central portion of the cover moves beneath the panel as the cover is moved into the open position and moves upwardly until it is substantially flush with the panel upper surface as the cover is moved into the closed position.

In further accordance with the present invention, the housing member includes lateral guide members and vertical guide members that resilient align and position the sliding cover. The lateral guide members engage edges of the lateral portions of the cover, and keep the cover aligned with the panel opening. The vertical guide members engage a lower surface of the lateral portions and bias the cover upwardly into the substantially flush position relative to the panel upper surface.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
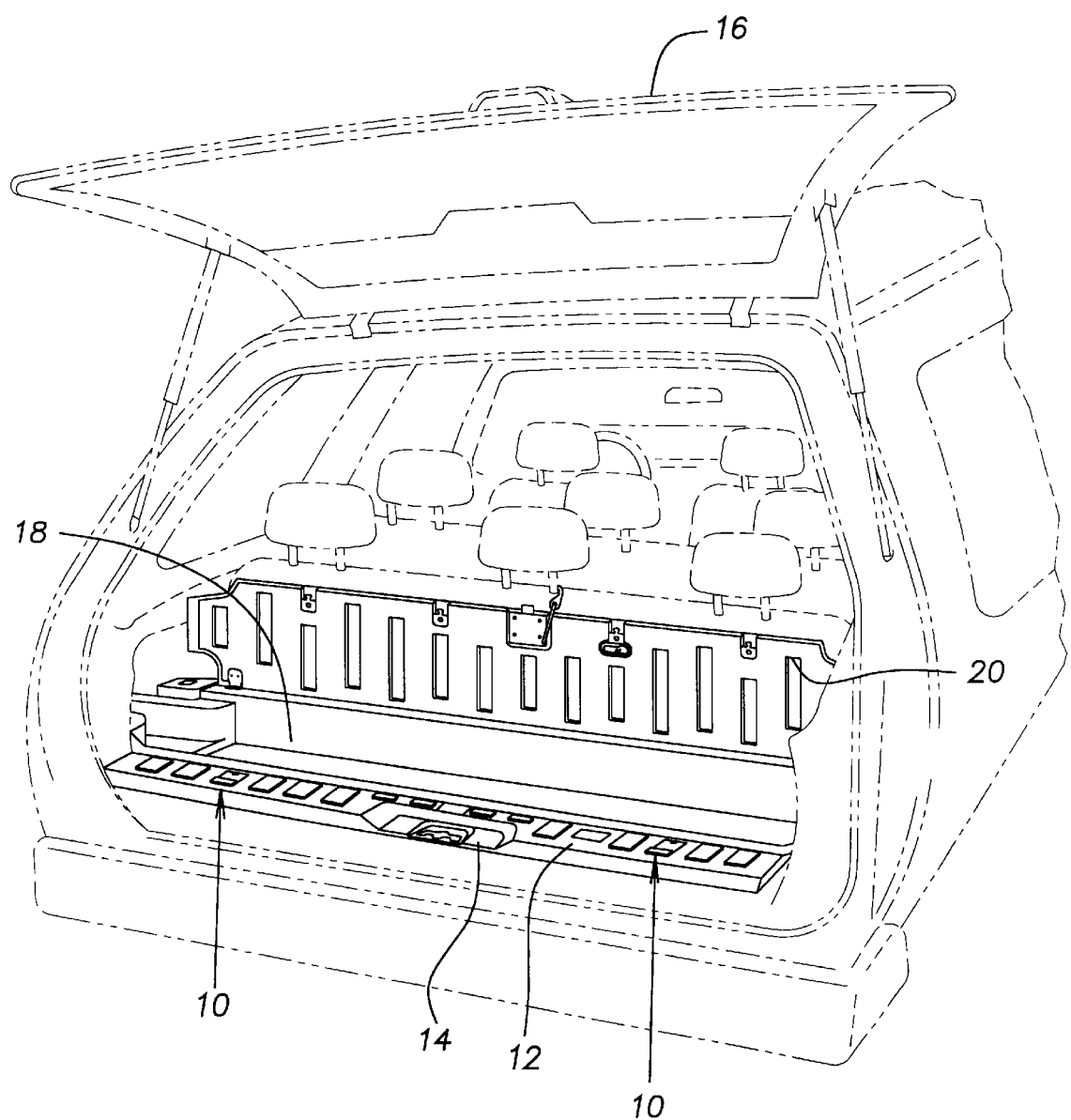
FIG. 1 schematically illustrates a rear end of a vehicle incorporating a cover assembly according to the present invention.

With reference to FIG. 1, a vehicle incorporating the present invention is illustrated. The vehicle includes a plurality of seats, including what is referred to in the art as third row seating. To facilitate securing a child seat in the third row, an anchor assembly 10 is provided at a location relatively behind the third row seating. It should be noted that the present invention is not limited to the illustrated preferred location, this location merely being shown to illustrate one possible location for the anchor assembly 10.

Figure 2:
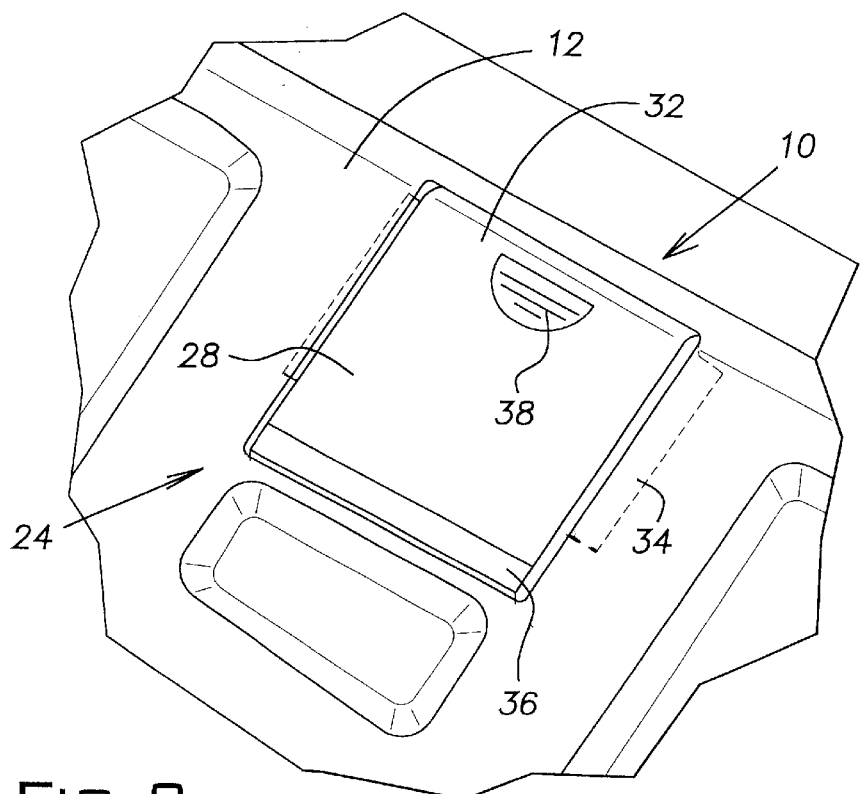
FIG. 2 is an enlarged perspective view of the cover assembly and a surrounding portion of the vehicle, with a cover of the cover assembly in a closed position.

With reference to FIG. 2, the anchor assembly 10 is shown to be mounted to the vehicle at a panel 12 that includes the latch assembly 14 for the rear hatch 16. A cargo bin liner 18 is disposed relatively forwardly of the anchor assembly 10, and is selectively covered/revealed by a movable cargo bin lid 20, shown in an open position. Insofar as the structure of the cargo bin liner 18, the cargo bin lid 20, and the panel 12 is not the subject of the present invention, and is not necessary for understanding of the present invention, they will not be discussed in detail hereinafter.

The anchor assembly 10 includes an anchor 22 and an anchor cover assembly 24. The anchor cover assembly 24 includes a lower housing 26 and a sliding cover 28. The anchor 22, which is affixed to a subjacent mounting surface, includes an upstanding U-shaped arm 30. As will be apparent from the following discussion, the upstanding arm 30 is received within the anchor cover assembly 24, and is accessible to the user when the sliding cover 28 is opened.

The sliding cover 28 includes a raised middle portion 32 and a pair of recessed lateral portions 34 that cooperate with the panel 12 and lower housing 26, in a manner to be described more fully hereinafter, to permit the cover 28 to move smoothly between the open and closed positions and to spring into a position that is generally flush with the panel 12 when moved into the closed position. The relatively raised middle portion 32 of the upper sliding cover 28 further includes a beveled or canted surface 36 at a first or forwardly-facing end, and an opposite or second, rearwardly facing end that has an enlarged edge. The beveled surface 36 at the first or forwardly facing end assists in slidably inserting the cover 28 beneath the panel 12 as the cover 28 is slid from the closed position into the open position. The surface of the cover 28 at the second end includes a recessed finger-grip portion 38 that facilitates user manipulation of the cover 28. A lower surface of the cover 28 includes a downwardly directed rib 40 that serves to stiffen the cover 28 to prevent deformation thereof. As the cover is moved into the closed position, the recessed lateral portions 34 snap over a detent 42 provided by the lower housing 26 to keep the cover closed and to provide positive tactile feedback to the user when the cover 28 has reached the closed position, as will be apparent from the discussion of the operation of the anchor cover assembly 24.

The panel 12 that the anchor cover assembly 24 is mounted to provides an opening 44, and the lower housing 26 of the anchor cover assembly 24 is secured to a lower surface of the panel 12 so as to surround the opening 44. The sliding cover 28 is movable relative to the opening 44 between the open position, in which the opening 44 is substantially exposed, and a closed position, in which the opening 44 is covered. As noted briefly hereinbefore, when in the closed position the upper surface of the sliding cover 28 is substantially flush with the upper surface of the panel 12. Therefore, the anchor cover assembly 24 advantageously provides a flush finish that helps prevent items from snagging on the panel 12 surrounding the panel opening 44. In addition to being visually appealing, such a flush fit of the sliding cover 28 to the panel 12 also helps to prevent dirt and debris from being trapped in the cover assembly 24, as would occur if the sliding cover 28 were ordinarily recessed relative to the panel upper surface.

Figure 4:
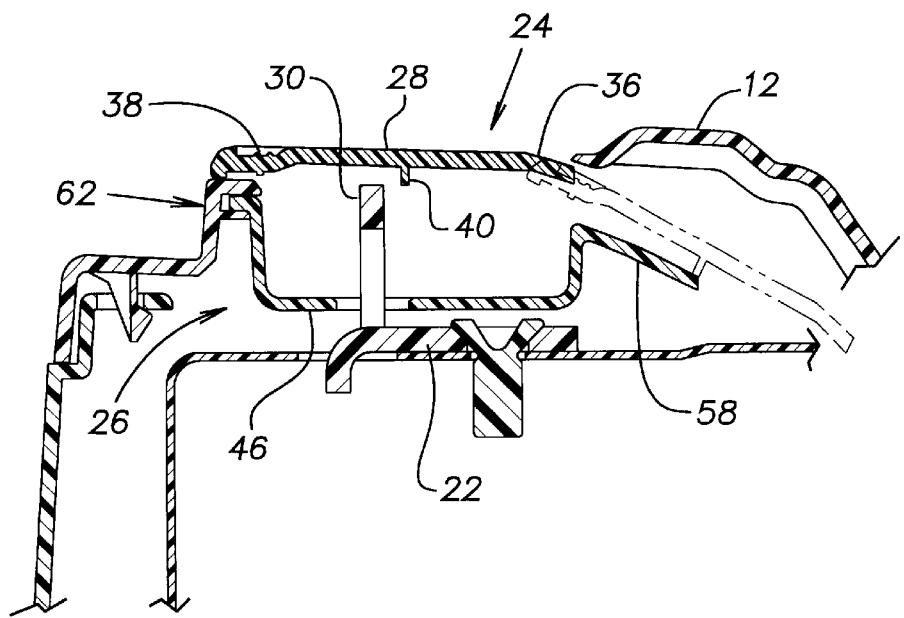
FIG. 4 is a cross sectional view of the cover assembly and surrounding portions of the vehicle, with solid lines showing the cover closed and dashed lines showing the cover open.
Figure 5:
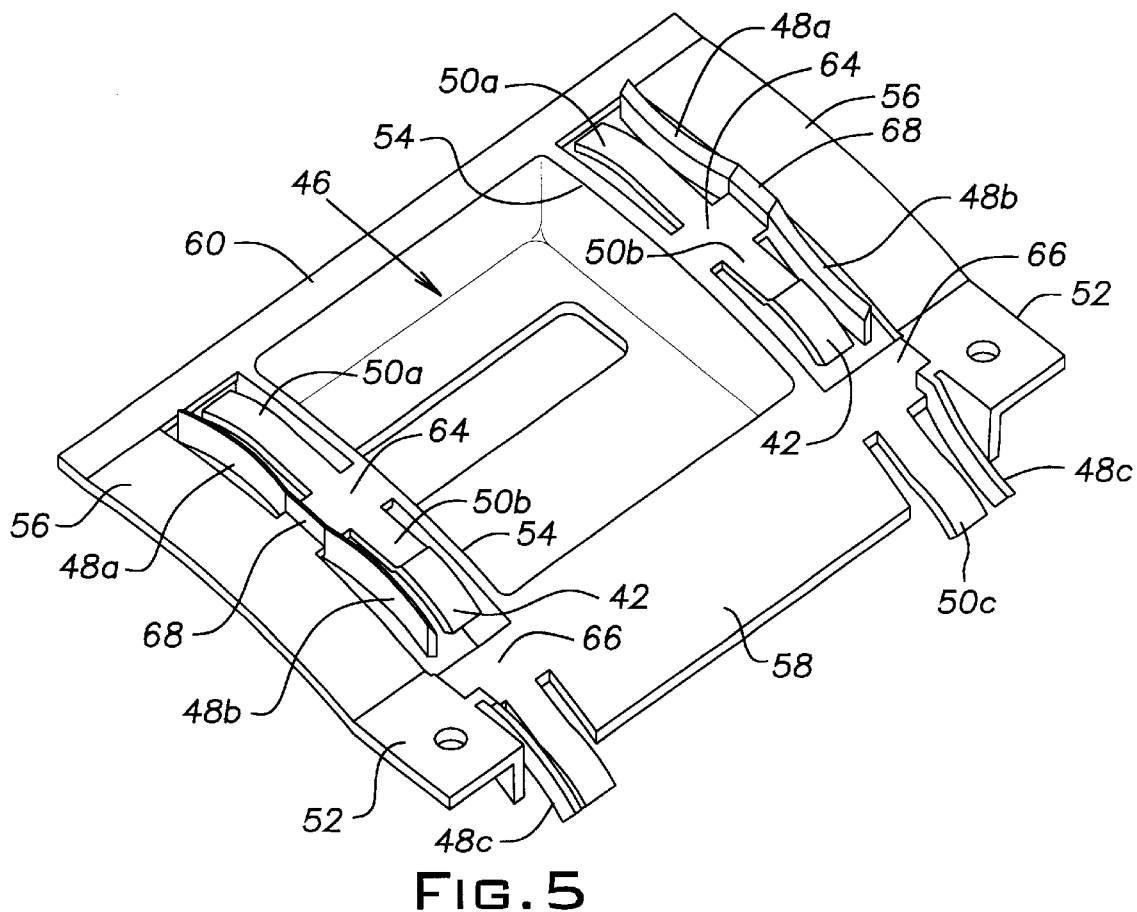
FIG. 5 is a perspective view of a lower housing of the cover assembly.

The lower housing 26 of the anchor cover assembly 24 is best seen in FIG. 5, and includes a central cup portion 46, lateral guide members 48a, 48b, 48c, vertical guide members 50a, 50b, 50c, mounts 52, and plurality of support surfaces 54, 56, 58. A rearward facing mounting surface 60 is adapted for receipt in a mounting groove 62 (FIG. 4) provided adjacent a rear edge of the opening 44 in the panel 12. With the mounting surface 60 so preliminarily positioned, the mounts 52 at the forward end of the lower housing are secured to an accommodating surface (not shown) provided by or beneath the lower surface of the panel 12 to affix the lower housing 26 relative to the panel 12.

Figure 3:
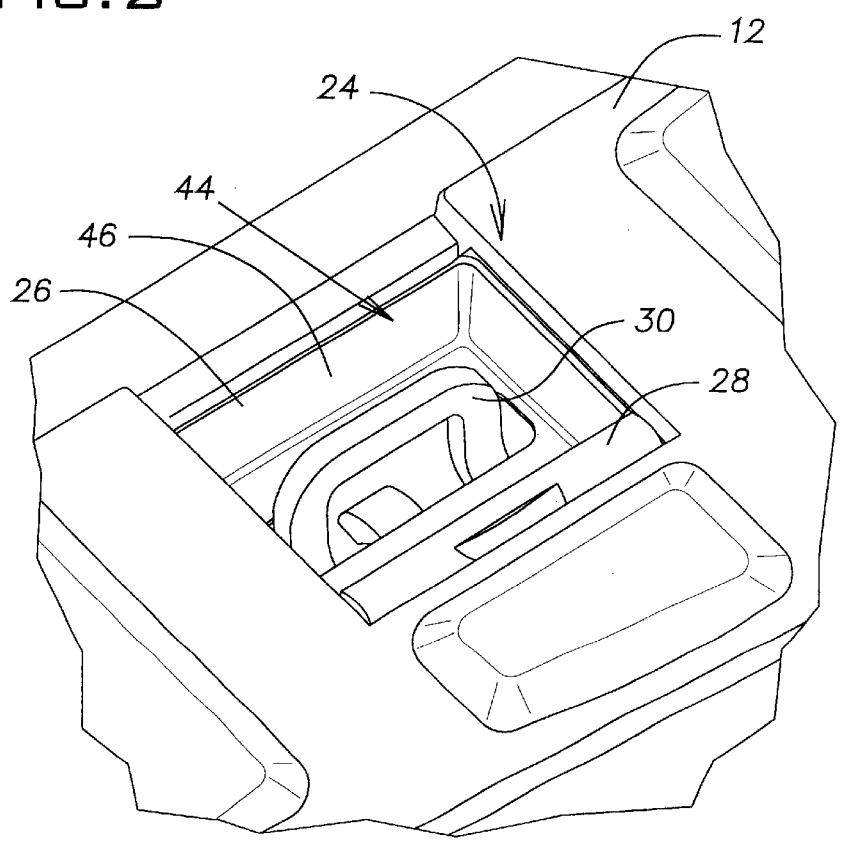
FIG. 3 is a view similar to FIG. 2, but with the cover in an open position.

With reference to FIG. 3, the central cup portion 46 is sized such that the recess provided thereby is aligned with the panel opening 44 and generally matches the dimensions of the panel opening, it being remembered that the cup-shaped portion 46 is visible when the sliding cover 28 is open. An upper rim of the cup shaped portion 46 is curved such that a rearward portion of the recess is slightly deeper than the forward portion thereof (FIG. 4). A bottom of the cup-shaped portion 46 defines a central opening through which the U-shaped arm 30 of the anchor extends, as illustrated.

With reference to FIG. 5, the support surfaces include inner support surfaces 54, outer support surfaces 56, and a forward support surface 58. Like the upper rim of the cup shaped portion 46, each of the support surfaces are slightly curved. The inner support surfaces 54 are provided by first and second lateral rim surfaces of the cup shaped member 46. The outer support surfaces 56 are disposed laterally outside the guide members. The inner and outer support surfaces are preferably slightly curved. The forward support surface 58, which has a slightly curved shape that is preferably a continuation of the arc defined by the inner support surface 54, includes a proximal edge adjacent the forward edge of the cup shaped member 46 and a distal free edge remote from the cup shaped member, as illustrated.

The mounting surface 60 interconnects the rearward portions of the second support surfaces 56 and the rearward portions of the first support surfaces 54 as well as a rear portion of the cup shaped member 46. First bridge members 64 interconnect the inner support surfaces 54 with the outer support surfaces 56 while second bridge members 66 connect the third support surface 58 to the mounts 52. The first bridge members 64 have vertical tabs 68, referred to hereinafter as first bridge member vertical tabs 68, extending upwardly therefrom at locations relatively closer to the outer support surfaces 56 than the inner support surfaces 54.

The guide members provided by the lower housing are operable to support and guide the lateral portions 34 of the sliding cover 28 as the cover moves between its open and closed positions. More specifically, the guide members include pairs of spring-like elements that are operable to both bias the sliding cover 28 into lateral alignment with the opening in the panel 12 and to maintain the cover 28 in a desired vertical position as the cover 28 is moved between the full open position (wherein the cover 28 is substantially flush with the panel 12) and a full closed position (wherein the cover 28 is disposed vertically beneath the panel 12). For ease of description, the pairs of spring-like elements that comprise the guide members will be described hereinafter as comprising first, second, and third vertical guide members 50a, 50b, 50c as well as first, second, and third lateral guide members 48a, 48b, 48c. In this regard it is noted that each of the vertical and lateral guide members are disposed relatively beneath the panel 12, and are not visible during ordinary operation and use of the anchor assembly 10.

The first lateral and vertical guide members 48a, 50a are disposed toward a rear end of the lower housing 26, while the third lateral and vertical lateral guide members 48c, 50c are disposed toward a front end of the lower housing 26. The second lateral and vertical guide members 48b, 50b are disposed between the first and third lateral and vertical guide members 48a, 50a, and 48c, 50c, as illustrated. Each of the guide members are integrally formed spring-like elements. The guide members are preferably integrally injection molded with the lower housing 26 so as to form a unitary and easily installed structure.

As illustrated, the first vertical guide members 50a extend rearwardly from the first bridge members 64 and the second vertical guide members 50b extend forwardly from the first bridge members 64. Each of the first and second vertical guide members 50a, 50b includes a proximal end that is integral with the first bridge members 64 and a free distal end. The first and second vertical guide members 50a, 50b are curved so as to include a portion that extends upwardly above the inner support surfaces 54. The distal end of the second vertical guide members 50b includes the enlarged portion or detent 42 that cooperates with the sliding cover lateral portions 34 to snap-fit the cover in the closed position.

Similarly, the first lateral guide members 48a extend forwardly from the first bridge member vertical tabs 68 and the second lateral guide members 48b extend rearwardly from the first bridge member vertical tabs 68. Each of the first and second lateral guide members 48a, 48b includes a proximal end that is integral with the first bridge member vertical tabs 68 and a free distal end. The first and second lateral guide members 48a, 48b are curved (i.e., concave/convex) so as to extend inwardly toward one another. The first and second lateral guide members 48a, 48b also extend downwardly relatively beneath the upper surface of the associated first and second vertical guide members 50a, 50b so as to prevent the cover 28 from being trapped beneath the first and second lateral guide members 48a, 48b.

The third vertical guide members 50c extend forwardly and downwardly from the second bridge members 66 while the third lateral guide members 48c extend forwardly and downwardly from a junction of the second bridge members 66 with the mounts 52, as illustrated. The third vertical guide members 50c are curved so as to extend upwardly above the forward support surface 58, while the third lateral guide members 48c are also curved to extend relatively inwardly toward each other.

In use, the recessed lateral portions of the cover 28 are received between the lower housing and the lower surface of the panel 12. More specifically, the lower surfaces of the lateral portions 34 of the cover 28 ride upon the vertical guide members 50a, 50b, 50c and the lateral edges of the cover lateral portions 34 ride against, or very close to, the lateral guide members 48a, 48b, 48c. When the cover 28 is slid forwardly toward the open position from the closed position, the beveled forward portion 36 of the cover 28 passes beneath the panel 12, and moves relatively downwardly so that the entire cover, except the rearward edge thereof, is disposed beneath the panel 12 when the cover 28 is completely open (FIG. 3).

The spacing between the pair of guide members (i.e., the first lateral guide members 48a) is selected to generally match that of the cover 28 so that, should the cover 28 become misaligned laterally during opening and closing, the guide members will bias or push the cover 28 back into alignment. Moreover, the spacing between the vertical guide members (especially the first and second vertical guide members 50a, 50b) and the upper surface of the panel 12 is selected such that, when the cover 28 is in the closed position, the first and second vertical guide members 50a, 50b are in engagement with the lower surface of the cover lateral portions 34 and urge the cover upwardly, thereby making the cover upper surface substantially flush with the upper surface of the surrounding panel 12. Also, as the cover 28 is moved into the closed position, forward edges of the cover lateral portions 34 snap over the detent 42 of the second vertical guide members 50b to help retain the cover 28 in the closed position and to give the user tactile feedback that the cover 28 is in the closed position. Preferably, the engagement between the forward edges of the lateral portion and the detent 42 is easily overcome by user-applied force when the cover 28 is moved forwardly from the closed position to the open position.

The present invention has been described with particularity herein, but it is considered apparent that the invention is capable of numerous modifications, substitutions, and rearrangements of parts without departing from the scope and spirit of the present invention. Accordingly, the invention is not limited to that described herein, but is only defined by the claims appended hereto.

What is claimed is:

1. A cover assembly adapted for securement to a panel, the panel having an upper surface and a lower surface and defining an opening that is selectively covered and opened by said cover assembly, said cover assembly comprising:

a sliding cover that is movable between an open position, wherein the sliding cover extends beneath the panel, and a closed position, said sliding cover including a central portion and lateral portions, said lateral portions being recessed relative to the central portion; and, a housing member secured to the lower surface of the panel, said housing member including guide members to guide said sliding cover as the cover is moved between the open and closed positions, said guide members being operable to maintain said sliding cover in alignment with said opening and, when said sliding cover is moved into the closed position, to force the cover upwardly such that an upper surface of said cover is substantially flush with said panel upper surface, wherein said guide members inclued lateral guides and vertical guides, said lateral guides being operable to maintain the cover aligned with the opening and the vertical guides being operable to bias the cover upwardly, and wherein said lateral portions of the sliding cover are engaged by said lateral and vertical guides.

2. The cover assembly according to claim 1, wherein a lower surface of said lateral portions engages said vertical guides and wherein the lateral guides edges of the lateral portions.

3. The cover assembly according to claim 2, wherein said lateral guides include pairs of lateral guide members, said lateral guide members being resiliently deformable by engagement with said lateral portion edges and serve to bias the cover into alignment with the opening.

4. The cover assembly according to claim 3, wherein said vertical guides include pairs of vertical guide members, said vertical guide members being resiliently deformable by engagement with said lower surface of said cover lateral portions and serve to bias the cover upwardly until said cover upper surface is flush with said panel upper surface.

5. In combination, a panel and cover assembly, said panel defining an opening and having an upper surface and a lower surface, said cover assembly being secured to said panel, said cover assembly including a sliding cover and a housing, said housing being secured to said panel lower surface, said sliding cover being received between said panel and said housing and being movable between a first position, in which said opening is closed, and a second position in which said opening is revealed, an upper surface of said cover being substantially flush with said panel upper surface when said cover is in said first position and said cover extending beneath said panel when said cover is opened, said sliding cover including a central portion and lateral portions, said lateral portions being recessed relative to said central portion and being received between said housing and said panel, and wherein said housing includes lateral guide members and vertical guide members, said lateral guide members serving to maintain the cover in alignment with said opening and said vertical guide members serving to bias the cover upwardly when the cover is moved into the first position.

6. The combination according to claim 5, wherein a lower surface of said lateral portions engages said vertical guide members and wherein the lateral guide members engage edges of the lateral portions.

7. The combination according to claim 6, wherein said lateral guide members are provided in pairs disposed on relatively opposite sides of said cover, said lateral guide members being resiliently deformable by engagement with said lateral portion edges and serve to bias the cover into alignment with the opening.

8. The combination according to claim 7, wherein said vertical guides members are provided in pairs disposed on the relatively opposite sides of said cover, said vertical guide members being resiliently deformable by engagement with said lower surface of said cover lateral portions and serve to bias the cover upwardly.

9. The combination according to claim 8, wherein said cover lateral portions cooperate with a detent provided on at least one of said vertical guide members to provide tactile feedback to a user when said cover is in said first position.

10. The combination according to claim 9, wherein said housing includes a cup shaped recess, an inner support surface and an outer support surface, said inner and outer support surfaces being interconnected by bridge members, said vertical guide members integrally extending from said bridge members.

11. The combination according to claim 10, wherein vertical tab members extend from said bridge members, said lateral guide members integrally extending from said vertical tab members.

12. The combination according to claim 11, wherein said vertical guide members are curved and extend above the inner support surface.

13. The combination according to claim 12, wherein said lateral guide members are curved and extend inwardly toward one another.

14. The combination according to claim 12, wherein said panel includes a groove that receives an end of the housing to secure the housing end to the panel.

15. In combination, a panel and cover assembly, said panel having an upper surface and a lower surface and defining an opening that is selectively covered and opened by the cover assembly, said cover assembly comprising:

a cover that is movable between an open position, wherein the cover extends beneath the panel, and a closed position, wherein the cover extends over the opening; and a housing secured to the lower surface of the panel, said housing including:

a pair of lateral guides resiliently defromable to bias the cover into lateral alignment with the opening as the cover is moved between the open and closed positions; and a pair of vertical guides resiliently deformable to bias the cover upwardly such that an upper surface of the cover is substantially flush with the upper surface of the panel when the cover is moved into the closed position.

16. The combination according to claim 15, wherein the cover includes a central portion and lateral portions, said lateral portions being disposed between the lower surface of the panel and the housing.

17. The combination according to claim 16, wherein the lateral portions of the cover are engaged by the lateral guides and the vertical guides of the housing.

* * * * *

UNITED STATES PATENT AND TRADEMARK OFFICE
CERTIFICATE OF CORRECTION

PATENT NO.     : 6,666,504 B2                                           Page 1 of 1
DATED          : December 23, 2003
INVENTOR(S)    : Guanzon et al.

It is certified that error appears in the above-identified patent and that said Letters Patent is hereby corrected as shown below:

<u>Title page</u>,
Item [57], ABSTRACT,
Line 1, delete "is".

<u>Column 6</u>,
Line 10, delete "inclued" and insert -- include --.
Line 19, after "lateral guides" insert -- engage --.

Signed and Sealed this

Sixth Day of April, 2004

JON W. DUDAS
*Acting Director of the United States Patent and Trademark Office*